(12) United States Patent
Baur et al.

(10) Patent No.: US 11,592,021 B2
(45) Date of Patent: Feb. 28, 2023

(54) HELICAL SPRING FOR A PUMP HAVING AN ADJUSTABLE DELIVERY VOLUME

(71) Applicant: Schwäbische Hüttenwerke Automotive GmbH, Aalen-Wasseralfingen (DE)

(72) Inventors: Winfried Baur, Altheim (DE); Gerd Jäggle, Ertingen (DE); Simone Schilling, Ogglshausen (DE); Sven Peters, Bad Schussenried (DE); Thomas Tontsch, Bad Schussenried (DE)

(73) Assignee: Schwäbische Hüttenwerke Automotive GmbH, Aalen (DE)

( * ) Notice: Subject to any disclaimer, the term of this patent is extended or adjusted under 35 U.S.C. 154(b) by 0 days.

(21) Appl. No.: 17/459,009

(22) Filed: Aug. 27, 2021

(65) Prior Publication Data

US 2022/0065248 A1 Mar. 3, 2022

(30) Foreign Application Priority Data

Aug. 28, 2020 (DE) ...................... 10 2020 122 522.9

(51) Int. Cl.
*F03C 2/00* (2006.01)
*F03C 4/00* (2006.01)
(Continued)

(52) U.S. Cl.
CPC ............ *F04C 14/226* (2013.01); *F04C 2/344* (2013.01); *F16F 1/08* (2013.01); *F04C 2240/80* (2013.01)

(58) Field of Classification Search
CPC .... F04C 2/08; F04C 2/10; F04C 2/344; F04C 14/18; F04C 14/226; F04C 2210/206;
(Continued)

(56) References Cited

U.S. PATENT DOCUMENTS

| 4,111,407 A | * | 9/1978 | Stager | ...................... | F16F 1/08 |
| | | | | | 267/166.1 |
| 4,120,489 A | * | 10/1978 | Borlinghaus | ............. | F16F 1/08 |
| | | | | | 267/166.1 |

(Continued)

FOREIGN PATENT DOCUMENTS

| DE | 1934984 A1 * | 1/1971 | ............... F01F 1/08 |
| DE | 2000472 A1 | 7/1971 | |

(Continued)

OTHER PUBLICATIONS

DE102016226117A1—Gitt-Gehrke et al.—Vane pump. Fluid System and Internal combustion Engine—Jun. 2018—the English Translation. (Year: 2018).*

(Continued)

*Primary Examiner* — Theresa Trieu
(74) *Attorney, Agent, or Firm* — RatnerPrestia

(57) ABSTRACT

A pump having an adjustable delivery volume, including: a pump housing featuring a delivery chamber which includes a delivery chamber inlet for a fluid and a delivery chamber outlet for the fluid; a delivery member, which can be rotated within the delivery chamber, for delivering the fluid; an adjusting device featuring a setting structure, which is mounted such that it can move back and forth within the (Continued)

pump housing in order to adjust the delivery volume of the pump, and a helical spring for applying a spring force, which acts in a setting direction, to the setting structure, wherein the windings of the helical spring are enclosed by an envelope lying on the outside of the helical spring wherein the cross-sectional area of the envelope as measured transversely with respect to the longitudinal direction of the spring changes progressively in the longitudinal direction of the spring.

11 Claims, 4 Drawing Sheets

(51) Int. Cl.
    *F04C 2/00*         (2006.01)
    *F04C 18/00*       (2006.01)
    *F04C 14/22*       (2006.01)
    *F04C 2/344*      (2006.01)
    *F16F 1/08*        (2006.01)

(58) Field of Classification Search
    CPC . F04C 2240/80; F16F 1/04; F16F 1/06; F16F 1/043; F16F 1/046; F16F 1/047; F16F 1/08; F16F 2230/10; F16F 2230/22
    See application file for complete search history.

(56) References Cited

U.S. PATENT DOCUMENTS

| | | | | |
|---|---|---|---|---|
| 4,733,036 | A | * | 3/1988 | Koizumi .............. H01H 13/705 200/276.1 |
| 2005/0005354 | A1 | * | 1/2005 | Gladney ................... F16F 1/04 267/180 |
| 2006/0042016 | A1 | * | 3/2006 | Barman .................... F16F 1/08 267/166.1 |
| 2011/0148018 | A1 | * | 6/2011 | DeFranks ................. F16F 1/08 267/166.1 |

FOREIGN PATENT DOCUMENTS

| | | |
|---|---|---|
| DE | 102005033293 A1 | 1/2007 |
| DE | 102012014887 A1 | 1/2014 |
| DE | 102014102061 A1 | 8/2015 |
| DE | 2019-007454 A | 1/2019 |
| WO | 2016182490 A1 | 11/2016 |

OTHER PUBLICATIONS

DE1934984A1—Borlinghaus,—Kegelstumpffoermige Feder Mit Linearer Oder Teilweise Linearer,teilweise Progressiver Kennlinie—Jan. 1971—the English Translation. (Year: 1971).*
German Search Report issued in German Patent Application No. 10-2020-122522.9, dated Jun. 4, 2021, 7 pages. (partial translation).
Extended European Search Report for European Application No. 21 191 038.5, dated Jan. 26, 2022, with translation, 12 pages.

* cited by examiner

HELICAL SPRING FOR A PUMP HAVING AN ADJUSTABLE DELIVERY VOLUME

CROSS REFERENCE TO RELATED APPLICATION

This application claims benefit of priority from German Patent Application No. 10 2020 122 522.9, filed Aug. 28, 2020. The contents of this application are incorporated herein by reference.

BACKGROUND OF THE INVENTION

Pumps, in particular rotary pumps, having an adjustable delivery volume are known from the prior art. Such pumps are for example used to deliver lubricating oil to consumers in the automotive sector, in particular engines. Pumps of this type usually have an adjusting device comprising a setting structure via which the delivery volume can be regulated. In order to regulate the delivery volume, the setting structure is mounted such that it can move, in particular pivot, in the pump housing, wherein a setting force is applied to the setting structure via a setting element. Cylindrical compression springs having a constant winding diameter, so-called helical springs, are generally used as the setting element. The bearing surface, i.e. the outer winding diameter, of these springs is limited by the size of the pump and in particular by the size of the setting structure. In conventional prior-art pumps, this often results in helical springs having a large ratio between the length of the helical spring $L_0$ when not exposed to a load and the outer winding diameter D, wherein a ratio $L_0/D$ of greater than 4, in particular greater than 6, is not uncommon.

Such helical springs are often susceptible to buckling when exposed to an axial compressive load, i.e. the helical springs are subject to a loss of stability due to yielding transversely to their longitudinal direction when exposed to axial compressive stress. Buckling of the helical spring can have a negative impact on the pumps ability to be regulated and also either can destroy the helical spring immediately or exposes the spring material to additional stress with repeated buckling, thus promoting fatigue fracturing of the helical spring. In any event, a broken helical spring leads to a complete loss of the pump or at least to a malfunction of the pump, for example because the pump is throttled more prematurely or is no longer regulated at all.

The risk of buckling can be increased by the installation circumstances, in particular by how the helical springs are mounted. For instance, non-parallel bearing surfaces for the helical spring or bearing surfaces having a changing alignment with respect to each other promote buckling of the helical spring.

The changing alignment of the bearing surfaces is in particular a problem in pumps having a pivotable setting structure. The pivoting movement of the setting structure deflects the bearing surfaces for the helical spring, which are preferably aligned in parallel with each other, at an angle to each other. In addition to a force component in the axial direction of the helical spring, this additionally generates a radial force component additionally promotes yielding of the helical spring transversely with respect to its longitudinal direction.

The changing alignment of the bearing surfaces, when the setting structure can pivot, significantly shortens the critical spring travel $s_c$ at which the spring may buckle. The helical spring must be designed in such a way that the setting travel of the setting structure corresponds to at most the critical spring travel of the helical spring. In preferred embodiments, the helical spring must be designed such that the setting travel of the setting structure is smaller than the critical spring travel. Due to the limited installation space, this can usually only be achieved by selecting an appropriate material for the helical spring or a correspondingly large wire diameter for the helical spring, which often makes the helical spring expensive or means as applicable that the throttling characteristics of the pump cannot be optimally set. Solutions in the form of mandrels or sleeves for the helical spring, which are used to stabilize the helical spring and prevent the helical spring from buckling, cannot always be employed, depending on the type of pump, and also cause additional cost.

SUMMARY OF THE INVENTION

It is therefore an aspect of the invention to cost-effectively provide a pump having an adjustable delivery volume, in which the risk of damage to the pump due to buckling of the helical spring is minimized.

A pump such as an aspect of the invention relates to comprises a pump housing featuring a delivery chamber which comprises a delivery chamber inlet for a fluid and a delivery chamber outlet for the fluid. At least one rotatable delivery member, in particular a delivery rotor, for delivering the fluid is formed within the delivery chamber. In preferred embodiments, the pump is a vane cell pump, wherein the delivery member comprises a delivery rotor and at least one vane which is mounted such that it can slide within the delivery rotor. In other preferred embodiments, the pump is a pendulum-slider pump or a gear pump, in particular an external gear pump.

The pump also comprises an adjusting device featuring a setting structure, which is mounted such that it can move back and forth within the pump housing in order to adjust the delivery volume of the pump, and a helical spring for applying a spring force, which acts in a setting direction, to the setting structure. The setting structure is preferably a setting ring which preferably encloses the delivery chamber and the delivery member in the circumferential direction. The setting structure which is embodied as a setting ring preferably forms the boundary of the delivery chamber in the radial direction. The setting ring can be mounted, such that it can be pivoted or linearly adjusted, in order to adjust the delivery volume. In the case of an external gear pump in particular, the setting structure can be a setting piston which is preferably arranged axially with respect to the delivery chamber and the delivery member. The setting structure which is embodied as a setting piston preferably forms the boundary of the delivery chamber in the axial direction. The setting piston can be mounted, such that it can be pivoted or linearly adjusted, in order to adjust the delivery volume.

The setting structure is preferably embodied such that it can move, in particular pivot, back and forth in a first setting direction and a second setting direction. Adjusting the setting structure in the first setting direction preferably throttles the pump, i.e. reduces the delivery volume. Correspondingly, adjusting the setting structure in the second setting direction preferably increases the delivery volume.

For adjusting the delivery volume, a setting force which preferably acts in the first setting direction can be applied to the setting structure. The setting force can for example be generated by a fluid, in particular high-pressure fluid, which acts on a setting area of the setting structure. Preferably, high-pressure fluid from the high-pressure side of the pump is applied, in particular permanently, to a setting area of the setting structure. The pressure fluid can be diverted from the delivery chamber outlet and fed to the setting area of the setting structure, directly or for example via a control valve. Alternatively, the setting force can also for example be generated by an externally regulated actuator. Adjusting devices for adjusting the delivery volume of pumps, and in particular the mechanisms for generating a setting movement, are sufficiently known to person skilled in the art, for which reason they will not be discussed in further detail at this point.

In preferred embodiments, the spring force of the helical spring counteracts the setting force, i.e. in preferred embodiments, the spring force acts in the direction of maximum delivery volume. Depending on the application of the pump or the desired regulating characteristics of the pump, it is also conceivable for the helical spring to be used to throttle the pump. The spring force generated by the helical spring can also act on the setting structure in the direction of minimum delivery volume and/or together with the setting force. An aspect of the invention is not limited to compression springs; tension springs can for example also be used.

The helical spring is preferably formed by a round wire or rod wound helically in the longitudinal direction of the spring. The helical spring is particularly preferably formed by a round wire or rod wound helically about an axis pointing in the longitudinal direction of the spring. The round wire or rod can exhibit a circular or oval cross-section, for example an ovate cross-section. In alternative embodiments, the helical spring can also be formed from a wire having a polygonal cross-section, for example a rectangular cross-section, wound helically in the longitudinal direction of the spring.

The windings of the helical spring are enclosed by an envelope lying on the outside of the helical spring. The envelope is used exclusively to describe the helical spring and is theoretical in nature. The envelope should not in particular be equated with sleeves for stabilizing helical springs.

The envelope is in particular formed by a tangential, radially outer connection between each two windings of the helical spring which are adjacent in the longitudinal direction, wherein the surface of the helical wire can also be part of the envelope. The envelope depicts the three-dimensional shape of the helical spring, so to speak, wherein the free space between two adjacent windings is bridged tangentially.

The envelope encloses all the windings of the helical spring, in particular when the helical spring is not exposed to a load. A winding which is located centrally in the longitudinal direction of the spring is thus connected tangentially in the longitudinal section of the helical spring to each of two adjacent windings by a first tangent and a second tangent. If the point of contact of the first tangent and the point of contact of the second tangent do not lie at the same point on the surface of the helical wire, then the surface between the first point of contact and the second point of contact also forms a part of the envelope.

The envelope of a helical spring, such as is for example used in the prior art, is for example formed by a circular cylinder. In this case, the first tangent and the second tangent have the same point of contact with a centrally located winding in the longitudinal section of the helical spring. This means that the outer winding diameter of all the windings and also the cross-sectional area of the envelope as measured transversely with respect to the longitudinal direction of the spring are identical in size at every point on the helical spring.

In the helical spring in accordance with an aspect of the invention, the cross-sectional area of the envelope as measured transversely with respect to the longitudinal direction of the spring changes progressively in the longitudinal direction of the spring. The cross-sectional area of the envelope as measured transversely with respect to the longitudinal direction of the spring can preferably increase and/or decrease in the longitudinal direction of the spring.

Preferably, the cross-sectional area of the envelope decreases or increases monotonically in the longitudinal direction of the spring over the entire length of the helical spring or at least in a portion. A monotonic increase or decrease in the cross-sectional area is understood to mean a monotonic characteristic in the mathematical sense. The cross-sectional area of the envelope increases preferably always increases or decreases or stays the same in the longitudinal direction of the spring. The cross-sectional area of the envelope can increase or decrease monotonically or strictly monotonically over the entire length of the helical spring or at least in a portion. A strictly monotonic increase or decrease is understood to mean a strictly monotonic characteristic in the mathematical sense. The cross-sectional area of the envelope preferably always increases or decreases in the longitudinal direction of the spring.

This means that if the cross-sectional area increases or decreases strictly monotonically, two cross-sectional areas of the envelope which are adjacent in the longitudinal direction of the spring always exhibit different sizes, while if the cross-sectional area of the envelope increases or decreases monotonically, two cross-sectional areas which are adjacent in the longitudinal direction of the spring can exhibit the same size, wherein the envelope exhibits at least a maximum cross-sectional area and a minimum cross-sectional area in the longitudinal direction of the spring in relation to the entire length of the helical spring or in relation to the monotonically increasing or decreasing portion.

The envelope can consist of several portions in the longitudinal direction of the spring, wherein for example the cross-sectional area of the envelope increases monotonically or strictly monotonically in a first portion and decreases monotonically or strictly monotonically in a second portion, wherein the number of portions is not limited to two. In preferred embodiments, the helical spring comprises a first portion having a monotonically, e.g. strictly monotonically, increasing cross-sectional area and a second portion, which adjoins the first portion, having a monotonically, e.g. strictly monotonically, decreasing cross-sectional area. Preferably, the first portion and the second portion together form a portion of the envelope which is concave or convex in relation to the longitudinal direction of the spring.

The envelope preferably comprises at least one concave and/or at least one convex portion in relation to the longitudinal direction of the spring, wherein the concave or convex portion of the envelope can extend over the entire length of the helical spring. A concave or convex portion of the envelope is preferably concave or convex throughout in the circumferential direction of the helical spring.

Where a portion of the envelope which is concave in relation to the longitudinal direction of the spring is mentioned, this means that the cross-sectional area of the envelope increases monotonically and then, following this increase, monotonically decreases again in the longitudinal direction of the spring along the concave portion. A concave profile of the envelope is preferably understood to mean a bulge in the lateral view onto the helical spring. If the profile is concave, the cross-sectional area preferably increases and decreases again strictly monotonically. Correspondingly, a portion of the envelope which is convex in relation to the longitudinal direction of the spring means that the cross-sectional area of the envelope decreases monotonically and then, following this decrease, monotonically increases again in the longitudinal direction of the spring along the convex portion. A convex profile is preferably understood to mean a constriction in the lateral view onto the helical spring. If the profile is convex, the cross-sectional area preferably increases and decreases again strictly monotonically.

The cross-sectional area at the beginning of the concave and/or convex portion can be identical or different in size to the cross-sectional area at the end of the concave and/or convex portion. Preferably, the cross-sectional area at the beginning of the concave and/or convex portion is identical in size to the cross-sectional area at the end of the concave and/or convex portion. In alternative embodiments, the cross-sectional area at the end of the concave and/or convex portion can be smaller or larger than the cross-sectional area at the beginning of the concave and/or convex portion.

In preferred embodiments, the envelope of the helical spring is continuously concave or convex in the longitudinal direction of the spring, i.e. the envelope exclusively exhibits a concave or convex portion which extends in the longitudinal direction of the spring from a first winding end of the helical spring up to a second winding end of the helical spring. The cross-sectional area of the envelope at the first winding end can exhibit a different size to the cross-sectional area at the second winding end of the helical spring. Preferably, the cross-sectional area at the first winding end of the helical spring exhibits the same size as the cross-sectional area at the second winding end of the helical spring.

In terms of its magnitude, the radius of curvature of the envelope exhibits at least the size of the wire diameter of the spring wire over the entire length of the helical spring. In preferred embodiments, the magnitude of the radius of curvature of the envelope is greater than 3 mm throughout. Particularly preferably, the envelope exhibits a radius of curvature, which in terms of its magnitude is larger than half the length of the helical spring, throughout in the longitudinal direction of the spring from a first winding end of the helical spring up to a second winding end of the helical spring.

In alternative embodiments, the envelope can exhibit a linear profile having a constant pitch in the longitudinal direction of the spring in a longitudinal section of the helical spring over the entire length of the helical spring or in at least one portion of the helical spring, wherein the magnitude of the pitch is preferably greater than 0 in relation to the longitudinal direction of the helical spring. Preferably, the cross-sectional area of the envelope increases or decreases strictly monotonically over the entire length of the helical spring or in the region of at least one portion. Alternatively, the cross-sectional area of the envelope can increase or decrease strictly monotonically in the longitudinal direction of the spring in at least one portion or over the entire length, wherein the increase or decrease in the longitudinal direction remains constant. The envelope preferably widens or tapers conically in the longitudinal direction of the spring in portions or over the entire length.

The envelope can also comprise at least one portion in which the envelope extends parallel to the longitudinal direction of the spring. The envelope can preferably comprise a portion in the longitudinal direction of the spring, in which the pitch in relation to the longitudinal direction of the spring is equal to 0. This parallel portion of the envelope can be formed at a first end of the helical spring and/or at a second end of the helical spring and/or in a central region of the helical spring in the longitudinal direction of the spring. Preferably, this parallel portion of the envelope is formed at a first end of the helical spring and at a second end of the helical spring or in a central region of the helical spring.

The cross-sectional area as measured transversely with respect to the longitudinal direction of the spring preferably changes only in size in the longitudinal direction of the spring. The shape of the cross-sectional area as measured transversely with respect to the longitudinal direction advantageously remains the same. In principle, it is also conceivable for the shape of the cross-sectional area to also change in the longitudinal direction of the spring, in addition to the size of the cross-sectional area. The envelope can for example exhibit a different shape in a first end portion of the helical spring and a second end portion of the helical spring in the longitudinal direction of the spring than in the region between the first end portion and the second end portion. The envelope particularly preferably exhibits a circular cross-sectional area throughout in the longitudinal direction of the spring.

In preferred embodiments, the cross-sectional area of the envelope at a first winding end of the helical spring and the cross-sectional area of the envelope at a second winding end of the helical spring are identical in size. In particularly preferred embodiments, the cross-sectional area of the envelope at the first winding end of the helical spring exhibits the same size and the same shape as the cross-sectional area of the envelope at the second winding end of the helical spring.

The cross-sectional area of the envelope is advantageously at a maximum or minimum in a central region of the helical spring in the longitudinal direction of the spring. Preferably, the envelope bulges in a central region of the helical spring or is constricted in a central region of the helical spring. The central region of the helical spring preferably extends over a complete winding of the helical spring.

The envelope advantageously exhibits a cross-sectional area having a furthest extent, which is smaller than 5 cm, and/or a cross-sectional area having a smallest extent, which is greater than 0.5 cm, in the longitudinal direction of the spring, wherein the furthest extent is understood to mean the greatest length as measured transversely with respect to the longitudinal direction of the spring, and the smallest extent is understood to mean the smallest length as measured transversely with respect to the longitudinal direction of the spring. In preferred embodiments, the cross-sectional area of the envelope is circular in every plane in the longitudinal direction of the spring, such that the largest extent and the smallest extent respectively correspond to the diameter of the cross-sectional area in the plane having the furthest extent and in the plane having the smallest extent, respectively. In the longitudinal direction of the spring, the envelope preferably exhibits a cross-sectional area having a diameter of less than 5 cm and a cross-sectional area having a diameter of more than 0.5 cm.

In alternative embodiments, the envelope can be elliptical in every plane of the longitudinal direction of the spring, such that the largest extent corresponds to the main axis and the smallest extent corresponds to the auxiliary axis of the ellipse. In a plane, the envelope can exhibit a cross-sectional area in which the smallest extent is greater than 0.5 cm and the greatest extent is smaller than 5 cm.

The envelope is preferably mirror-symmetrical, wherein a first plane which extends transversely with respect to the longitudinal direction of the spring and divides the helical spring in the middle forms the plane of symmetry of the envelope, and/or the envelope is mirror-symmetrical with respect to a second plane which extends in the longitudinal direction of the spring and divides the helical spring in the middle transversely with respect to the longitudinal direction of the spring. The envelope is particularly preferably rotationally symmetrical, wherein the longitudinal axis of the helical spring forms the axis of symmetry of the envelope. The envelope is preferably mirror-symmetrical in relation to the first plane, which extends transversely with respect to the longitudinal direction of the spring and divides the helical spring in the middle, and rotationally symmetrical with respect to the longitudinal axis of the helical spring.

The envelope can be embodied, at least when the helical spring is not exposed to a load, as a truncated cone, an hourglass, a bell or a barrel. A barrel-shaped envelope is preferably understood to mean an envelope which exhibits a concave profile over the entire length of the helical spring, while an envelope in the shape of an hourglass is preferably understood to mean a profile which is convex over the entire length of the helical spring. A bell is in particular characterized by a radius of curvature which increases progressively in the longitudinal direction of the spring, wherein the envelope asymptotically approaches a circular cylinder in the longitudinal direction of the spring.

The helical spring advantageously comprises at least two resilient windings and two non-resilient windings. The helical spring preferably comprises a total of at least four windings. The non-resilient windings are preferably formed at the first winding end and at the second winding end of the helical spring, wherein the resilient windings are formed between the first winding end and the second winding end. The number of resilient windings is particularly preferably a multiple of the number of non-resilient windings.

The end-facing area of the helical spring at the first winding end and the end-facing area of the helical spring at the second winding end are preferably parallel to each other. The winding at the first winding end and the winding and the second winding end can be surface-ground. The first winding and the second winding are preferably surface-ground to a quarter of the wire diameter of the helical spring.

In preferred embodiments, the winding pitch of the resilient windings of the helical spring is constant when the helical spring is not exposed to a load. Particularly preferably, the winding pitch of the resilient windings of the helical spring is less than 1 cm when the helical spring is not exposed to a load. The winding pitch of the non-resilient windings can be smaller or equal in size to the winding pitch of the resilient windings.

The helical spring is preferably formed by a helical compression spring, the characteristic curve of which comprises a linear portion and a progressive portion. In the region of the linear portion of the characteristic curve, the load and deformation of the spring preferably increase proportionally, while in the region of the progressive portion of the characteristic curve, the load increases more sharply than deformation. In the progressive portion of the characteristic curve, the spring advantageously becomes harder as the load increases. Alternatively, the helical spring can be embodied as a helical compression spring, the characteristic curve of which is continuously linear or progressive.

Depending on how the helical spring is embodied, the helical spring can initially deform linearly and behave progressively when exposed to an additional load. This is in particular the case with helical springs in which the envelope is formed as a truncated cone, a bell, an hourglass or a barrel. This is due in particular to the fact that the individual windings can completely or partially merge into each other due to their different winding diameters. The windings can preferably overlap completely or partially in the radial view. In this way, the spring travel can preferably be lengthened without the helical spring being able to buckle. The helical spring thus stabilizes itself as the spring travel increases.

The helical spring is preferably installed in the pump in such a way that the setting travel of the setting structure is smaller than the spring travel in the region of the linear characteristic curve. The helical spring is preferably installed in such a way that the windings do not merge into each other when the setting structure is maximally adjusted, i.e. the windings preferably do not overlap in the radial view. Alternatively, the helical spring can be installed in the pump in such a way that the setting travel of the setting structure is greater than the spring travel in the region of the linear characteristic curve. This means that the windings merge into each other when the setting structure is maximally adjusted.

The pump is in particular intended for use in a motor vehicle. It is preferably embodied as a motor vehicle pump. The pump is preferably intended for delivering a liquid, in particular a lubricant, coolant and/or actuating agent. It is preferably embodied as a liquid pump. The pump is preferably intended for supplying, lubricating and/or cooling a motor vehicle drive motor or a motor vehicle transmission. The fluid is preferably formed by an oil, in particular as an engine lubricating oil or gear oil. The pump can be embodied as an engine lubricant pump for a motor vehicle or as a gear pump for a motor vehicle. In other applications, it can be a gear pump for gearboxes in wind turbines.

The invention is explained below on the basis of example embodiments. Features disclosed by the example embodiments advantageously develop the subject-matter of the claims and also the embodiments explained above.

DETAILED DESCRIPTION OF THE INVENTION

Figure 1:
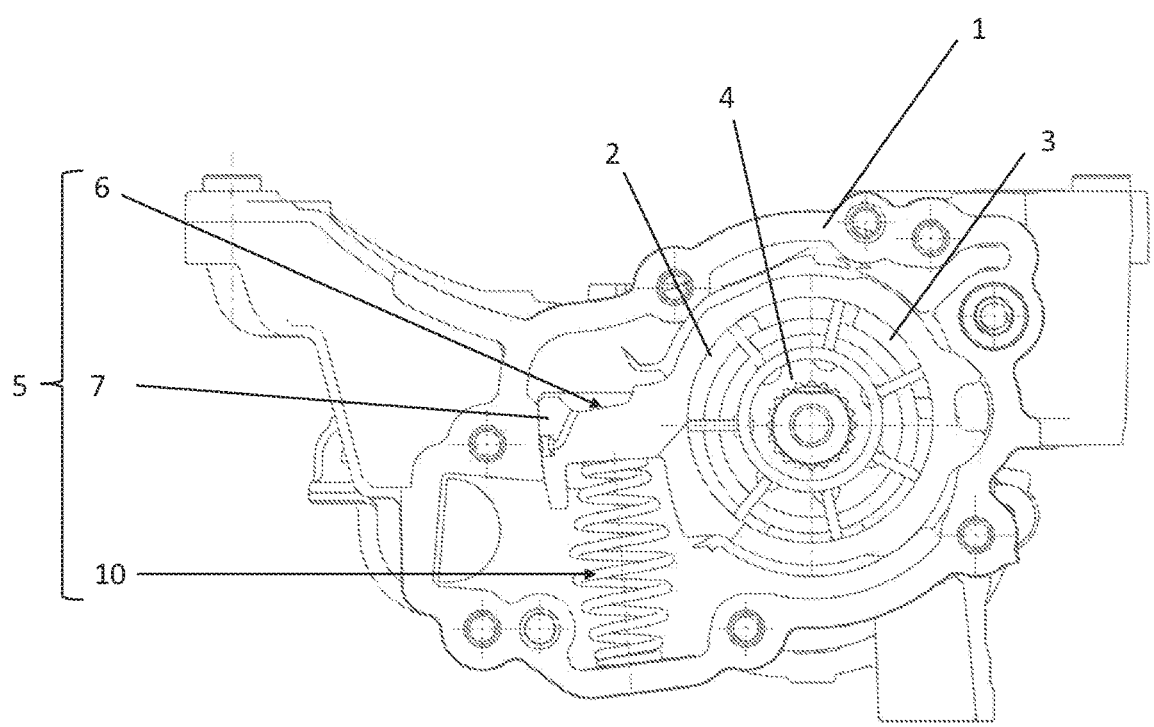
FIG. 1 a cross-section of a pump with a helical spring of a first example embodiment installed.

FIG. 1 shows a cross-section of a pump comprising a helical spring 10 in accordance with the first example embodiment. The pump comprises a pump housing 1 featuring: a delivery member 4 which delivers fluid from a delivery chamber inlet 2 to a delivery chamber outlet 3; and an adjusting device 5 for adjusting the delivery volume of the pump. The pump shown is a vane cell pump in which the delivery member 4 is formed by a delivery rotor comprising vanes which are mounted such that they can move radially. It will be apparent to the person skilled in the art that an aspect of the invention is not limited to vane cell pumps and can also be used in other pumps comprising an adjusting device.

The adjusting device 5 comprises a setting structure 7 featuring at least one setting area 6 and a helical spring 10. In the present embodiment, high-pressure fluid from the pump is applied to the setting area 6, whereby a setting force is exerted on the setting structure 7 as a function of the fluid pressure on the high-pressure side of the pump 1. The setting force acts counter to the spring force of the helical spring 10, such that the setting structure is pivoted within the pump housing when there is a force imbalance between the spring force and the setting force, wherein the setting force acts on the setting structure in the direction of minimum delivery volume and the spring force acts on the setting structure in the direction of maximum delivery volume.

Figure 2:
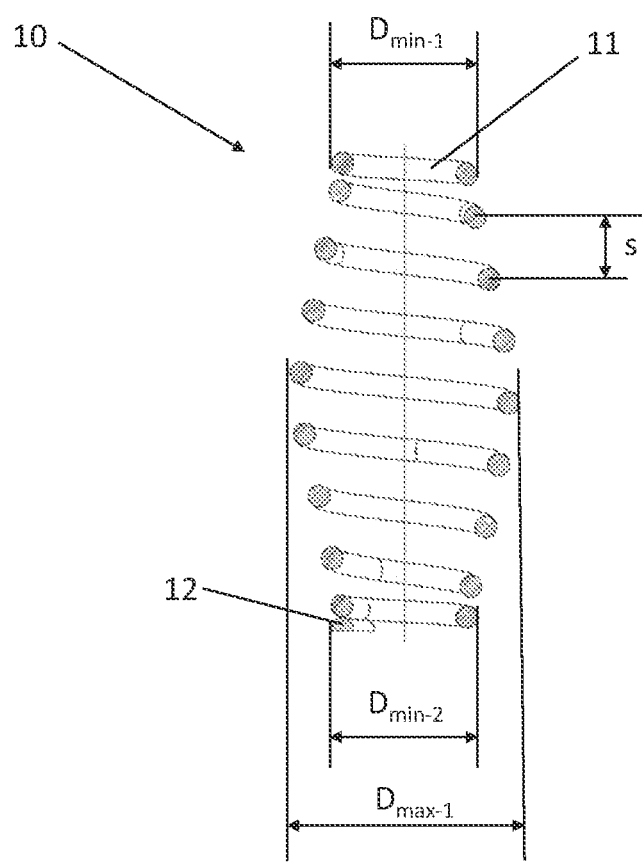
FIG. 2 a longitudinal section of a helical spring of the first example embodiment.
Figure 7:
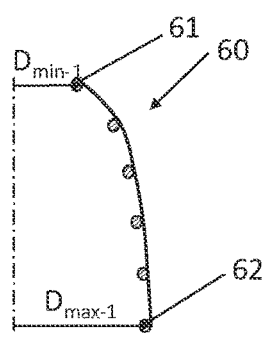
FIG. 7 a schematic longitudinal section of the helical spring of a sixth example embodiment.
Figure 8:
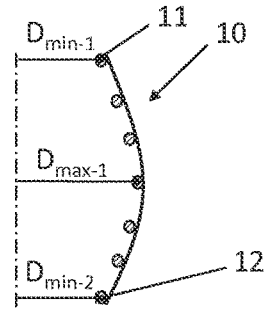
FIG. 8 a schematic longitudinal section of the helical spring of a seventh example embodiment.

In the example embodiment in FIG. 1, a so-called barrel spring is installed which is shown in FIG. 2 in a longitudinal section and in FIG. 8 in a schematic longitudinal section with the envelope lying on the outside of the helical spring 10. In addition to the helical spring 10 of the first example embodiment as shown, the springs of the example embodiments in FIGS. 3 to 7 can also be installed in the pump.

The envelope of the helical spring 10 is formed to be concave over the entire length of the helical spring 10 in relation to the longitudinal direction of the spring, i.e. the cross-sectional area of the envelope increases from a first winding end 11 towards the second winding end 12, up to a central region of the helical spring 10. The cross-sectional area of the helical spring 10, as measured transversely with respect to the longitudinal direction of the helical spring 10, exhibits its furthest extent $D_{max\text{-}1}$ in the central region of the helical spring 10. The cross-sectional area of the envelope decreases again from the central region of the helical spring 10 towards the second winding end 12.

The cross-sectional area of the envelope increases monotonically from the first winding end 11 up to the central region of the helical spring 10 and decreases monotonically from the central region of the helical spring 10 up to the second winding end 12. In the present example embodiment, the winding of the first winding end 11 and the winding of the second winding end 12 are non-resilient windings. In the region of the non-resilient windings, the envelope can exhibit a profile which is parallel to the longitudinal axis of the spring.

The cross-sectional area of the envelope has its smallest extent $D_{min\text{-}1}$ at the first winding end 11 and at the second winding end 12, wherein the cross-sectional area of the envelope at the first winding end 11 is identical in size to the cross-sectional area at the second winding end 12.

The envelope of the helical spring 10 is rotationally symmetrical in relation to the longitudinal axis of the helical spring 10, i.e. the cross-sectional area is formed to be circular throughout in the longitudinal direction of the spring, such that the furthest extent $D_{max\text{-}1}$ and the smallest extent $D_{min\text{-}1}$ correspond respectively to the diameter of the cross-sectional area in the region of the furthest extent $D_{max\text{-}1}$ and smallest extent $D_{min\text{-}1}$, respectively. The envelope of the helical spring 10 is also mirror-symmetrical, wherein the plane of symmetry extends transversely with respect to the longitudinal axis of the helical spring 10 and divides the helical spring 10 in the middle in the longitudinal direction of the spring.

The helical spring 10 comprises two non-resilient windings, wherein the first non-resilient winding is formed at the first winding end 11, and the second non-resilient winding is formed at the second winding end 12. The non-resilient windings are surface-ground, as shown by the second winding end 12 in FIG. 2, such that the end-facing area of the helical spring 10 at the first winding end 11 is parallel with the end-facing area at the second winding end 12 of the helical spring 10.

Figure 3:
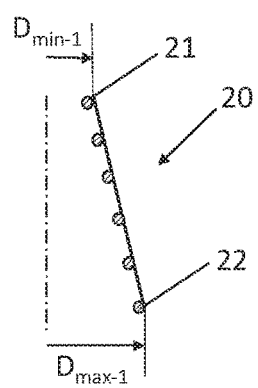
FIG. 3 a schematic longitudinal section of the helical spring of a second example embodiment.

FIG. 3 shows a schematic longitudinal section of another embodiment, wherein the helical spring 20 of the second embodiment can be substituted for the helical spring 10 in the pump from FIG. 1. For a better overview, the longitudinal section of the helical spring 20 is only shown to one side of the longitudinal axis of the helical spring 20.

Contrary to the example embodiment of the helical spring 10, the envelope of the helical spring 20 is a truncated cone, i.e. the envelope of the helical spring 20 exhibits a linear profile having a constant pitch over the entire length, wherein the magnitude of the pitch in relation to the longitudinal axis of the helical spring 20 is preferably greater than 0 throughout, wherein the cross-sectional area of the envelope increases monotonically from a first winding end 21 to a second winding end 22. In the present case, the increase in the cross-sectional area is strictly monotonic, i.e. no two cross-sectional areas which are adjacent in the longitudinal direction of the spring ever exhibit the same size.

The envelope of the helical spring 20 is rotationally symmetrical with respect to the longitudinal axis of the helical spring 20. Contrary to the first example embodiment of the helical spring 10, the envelope of the helical spring 20 is not mirror-symmetrical.

The envelope exhibits the cross-sectional area having the smallest extent $D_{min\text{-}1}$ at the first winding end 21 and the cross-sectional area with the furthest extent $D_{max\text{-}1}$ at the second winding end 22. The cross-sectional area increases strictly monotonically between the first winding end 21 and the second winding end 22. The cross-sectional area of the envelope of the helical spring 20 is formed to be circular.

Figure 4:
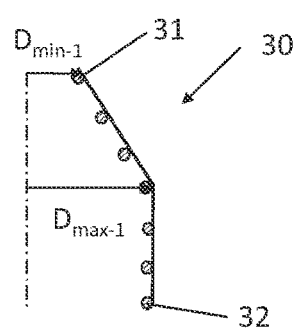
FIG. 4 a schematic longitudinal section of the helical spring of a third example embodiment.

FIG. 4 shows another example embodiment of a helical spring 30, wherein the cross-sectional area of the envelope increases monotonically. The helical spring 30 comprises a first spring portion which extends from the first winding end 31 up to the central portion of the helical spring 30. This is to be understood merely as an example embodiment, i.e. the first portion of the envelope of the helical spring 30 can be dimensioned to be shorter or longer in the longitudinal direction of the spring.

The envelope of the helical spring 30 exhibits a constant pitch in the first portion, the magnitude of which in relation to the longitudinal axis of the helical spring 30 is greater than 0. The first portion of the envelope of the helical spring 30 is thus formed as a truncated cone. A second portion adjoins the first portion in the longitudinal direction of the spring towards the second winding end 32, wherein the cross-sectional area of the envelope remains constant in the region of the second portion. The envelope exhibits a circular-cylindrical shape in its second portion, i.e. the envelope exhibits a constant pitch which is equal to 0 in its second portion.

The cross-sectional area of the envelope of the helical spring 30 has its smallest extent $D_{min\text{-}1}$ at the first winding end 31. The cross-sectional area of the envelope increases strictly monotonically from the first winding end 31 up to the cross-sectional area of the envelope of the helical spring 30 having the furthest extent $D_{max\text{-}1}$. While the cross-sectional area of the envelope of the helical spring 30 increases strictly monotonically within the first portion, the increase in the cross-sectional area over the entire length of the helical spring 30 is monotonic only.

The envelope of the helical spring 30 is also rotationally symmetrical with respect to the longitudinal axis of the helical spring 30. The cross-sectional area of the envelope of the helical spring 30 is formed to be circular throughout, wherein the cross-sectional area of the envelope at the first winding end 31 is smaller than the cross-sectional area of the envelope at the second winding end 32.

Figure 5:
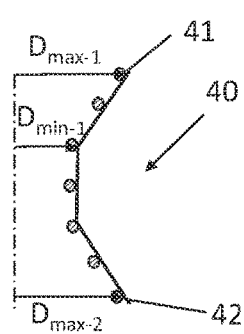
FIG. 5 a schematic longitudinal section of the helical spring of a fourth example embodiment.

The example embodiment in FIG. 5 shows a helical spring 40, the envelope of which is formed as an hourglass, i.e. the envelope of the helical spring 40 comprises a first portion, in which the cross-sectional area of the envelope decreases strictly monotonically, and a second portion in which the cross-sectional area of the envelope increases strictly monotonically. In the region of the first portion and in the region of the second portion, the envelope of the helical spring 40 exhibits a linear profile having a constant pitch, the magnitude of which in relation to the longitudinal axis of the helical spring 40 is greater than 0. Preferably, the magnitude of the pitch in the first portion is identical in size to the pitch in the second portion. In alternative embodiments, the magnitude of the pitch in the first portion can be greater than the magnitude of the pitch in the second portion.

The first portion and the second portion of the envelope of the helical spring 40 preferably extend to an identical extent in the longitudinal direction of the spring. Alternatively, one of the first portion or the second portion of the envelope of the helical spring 40 can extend further in the longitudinal direction of the spring than the other.

In addition to the first portion and the second portion, the envelope additionally comprises a third portion in which the cross-sectional area of the envelope remains unchanged in the longitudinal direction of the spring, i.e. the envelope of the helical spring 40 exhibits a pitch in relation to the longitudinal axis of the helical spring 40 which is equal to 0 in the third portion. In the example embodiment shown in FIG. 5, the third portion is arranged between the first portion and the second portion; the third portion could however also be arranged in the region of the first end of the helical spring 40 or in the region of the second end of the helical spring 40.

The envelope of the helical spring 40 is formed as a truncated cone in the first portion, wherein said truncated cone tapers from the first winding end 41 towards the second winding end 42. In the second portion, by contrast, the envelope of the helical spring 40 is formed as a truncated cone which tapers from the second winding end 42 towards the first winding end 41, i.e. the envelope of the helical spring 40 tapers in the first portion and in the second portion towards the third portion.

In the longitudinal direction of the spring, the envelope of the helical spring 40 exhibits the cross-sectional area having the smallest extent $D_{min-1}$ in the region of the third portion. The envelope exhibits a cross-sectional area having the smallest extent $D_{min-1}$ in the longitudinal direction of the spring throughout the region of the third portion. The envelope of the example embodiment in FIG. 5 exhibits the cross-sectional area having the largest extent at the first winding end 41 and at the second winding end 42, i.e. the cross-sectional area at the first winding end 41 is identical in size to the cross-sectional area at the second winding end 42. Alternatively, the cross-sectional area of the envelope at the first winding end 41 can be larger or smaller than the cross-sectional area at the second winding end 42.

The cross-sectional area of the envelope of the helical spring 40 is preferably formed to be circular throughout. The envelope of the helical spring 40 is formed to be rotationally symmetrical with respect to the longitudinal axis of the helical spring 40, and the envelope of the helical spring 40 is mirror-symmetrical, providing the cross-sectional area at the first winding end 41 is identical in size to the cross-sectional area at the second winding end 42 and providing the magnitude of the pitch of the envelope in the first portion and the magnitude of the pitch of the envelope in the second portion are identical, wherein the plane which is transverse to the longitudinal axis of the helical spring 40 and which divides the helical spring 40 in the middle in the longitudinal direction of the spring forms the plane of symmetry of the envelope, i.e. the longitudinal axis of the helical spring 40 forms the normal to the plane of symmetry of the helical spring 40.

In the example embodiment in FIG. 5, the envelope of the helical spring 40 is characterized by a first portion, a second portion and a third portion, wherein all three portions exhibit a linear profile having a constant pitch. The envelope of the helical spring 40 exhibits a convex profile in relation to the longitudinal axis of the helical spring.

Alternatively, the envelope of the helical spring 40 can exhibit a profile which is convex in relation to the longitudinal axis of the helical spring 40 over its entire length, wherein the first portion, the second portion and the third portion of the envelope exhibit a curved profile instead of a linear profile, wherein the radius of curvature of the first portion, the second portion and the third portion is preferably identical in size.

Figure 6:
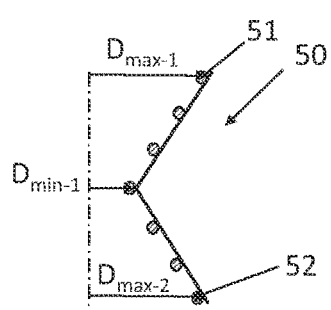
FIG. 6 a schematic longitudinal section of the helical spring of a fifth example embodiment.

The example embodiment in FIG. 6 differs from the example embodiment in FIG. 5 only in that the envelope of the helical spring 50 is formed exclusively from a first portion and a second portion. The statements made with respect to the first portion and the second portion of the example embodiment in FIG. 5 also apply to the example embodiment in FIG. 6, wherein the cross-sectional area of the envelope of the helical spring 50 also exhibits its smallest extent $D_{min-1}$ in the central region of the helical spring 50, wherein the smallest extent $D_{min-1}$ only occurs locally in a cross-sectional area of the envelope, i.e. the third portion of the example embodiment in FIG. 5 is reduced to a single plane in the longitudinal direction of the spring.

FIG. 7 discloses a helical spring 60 having a bell-shaped envelope. The helical spring of FIG. 7 broadly corresponds to the helical spring 30 of FIG. 4, wherein the envelope of the helical spring 60 exhibits a continuously curved profile instead of the conical first portion and the cylindrical second portion, wherein the radius of curvature increases progressively in the longitudinal direction of the spring from the first winding end 61 towards the second winding end 62, wherein the envelope asymptotically approaches a circular cylinder in the longitudinal direction of the spring from the first winding end 61 towards the second winding end 62.

The cross-sectional area of the envelope of the helical spring 60 exhibits its smallest extent $D_{min-1}$ at the first winding end 61 and its furthest extent $D_{max-1}$ at the second winding end 62, wherein the cross-sectional area of the envelope of the helical spring 60 increases strictly monotonically in the longitudinal direction of the spring.

The envelope of the helical spring 60 is also rotationally symmetrical with respect to the longitudinal axis of the helical spring 60. The cross-sectional area of the envelope of the helical spring 60 is formed to be circular throughout, wherein the cross-sectional area of the envelope at the first winding end 61 is smaller than the cross-sectional area of the envelope at the second winding end 62.

Figure 9:
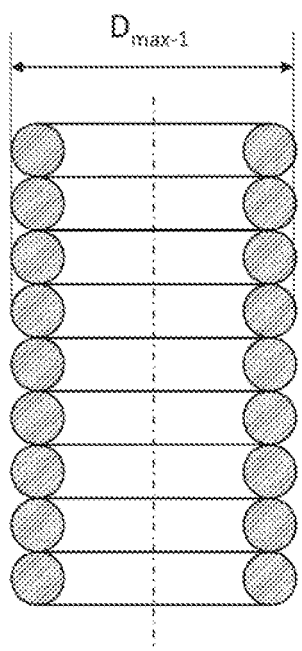
FIG. 9 a fully loaded cylindrical helical spring.

FIG. 9 shows a circular-cylindrical helical spring from the prior art which is fully loaded, i.e. the spring in FIG. 9 has been exposed to a load in the axial direction to such an extent that the individual windings are lying on each other.

Figure 10:
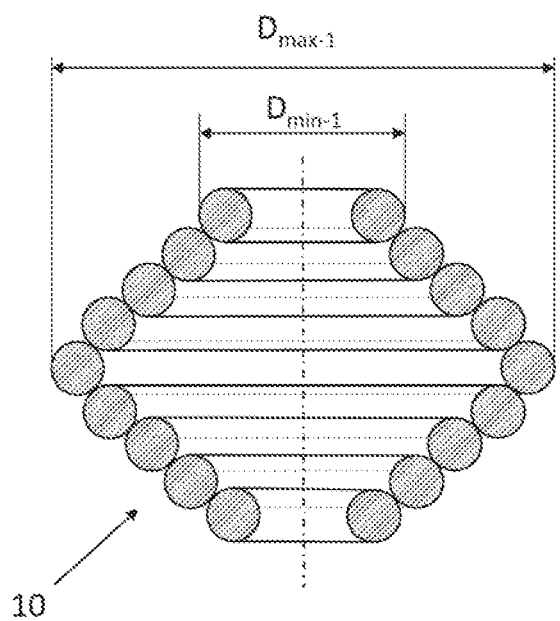
FIG. 10 a fully loaded barrel spring of the first example embodiment.

By comparison, FIG. 10 shows the helical spring 10 of the first example embodiment which is also fully loaded, i.e. the spring in FIG. 10 has been exposed to a load in the axial direction to such an extent that the individual windings merge into each other, i.e. the helical spring 10 has been exposed to a load in the axial direction to such an extent that the windings of the helical spring 10 overlap in a radial view.

The two springs in FIG. 9 and FIG. 10 have the same initial length when not exposed to a load. The two FIGS. 9 and 10 illustrate the extent to which the spring travel of the helical spring 10 can be increased by merging the individual windings of the helical spring 10, as compared to a circular-cylindrical spring. This has the additional advantage that the helical spring 10 can be embodied to be substantially shorter, for the same spring travel, for installing in the pump of FIG. 1. In this way, it is for example possible to reduce the ratio between the length of the helical spring 10 when not exposed to a load and the outer winding diameter of the helical spring. This in particular means that the helical spring is less susceptible to buckling.

LIST OF REFERENCE SIGNS

1 pump housing
2 delivery chamber inlet
3 delivery chamber outlet
4 delivery member
5 adjusting device
6 setting area
7 setting structure
10 helical spring
11 first winding end
12 second winding end
20 helical spring
21 first winding end
22 second winding end
30 helical spring
31 first winding end
32 second winding end
40 helical spring
41 first winding end
42 second winding end
50 helical spring
51 first winding end
52 second winding end
60 helical spring
61 first winding end
62 second winding end
S winding pitch
$D_{max-1}$ furthest extent
$D_{min-1}$ smallest extent

The invention claimed is:

1. A pump having an adjustable delivery volume, comprising:
   a. a pump housing featuring a delivery chamber which comprises a delivery chamber inlet for a fluid and a delivery chamber outlet for the fluid;
   b. a delivery member, which is rotatable within the delivery chamber, for delivering the fluid;
   c. an adjusting device
      i. featuring a setting structure, which is mounted such that it is movable back and forth within the pump housing in order to adjust the delivery volume of the pump,
      ii. and a helical spring for applying a spring force, which acts in a setting direction, to the setting structure, wherein
   d. the windings of the helical spring are enclosed by an envelope lying on the outside of the helical spring, wherein
   e. cross-sectional area of the envelope as measured transversely with respect to a longitudinal direction of the helical spring changes progressively in the longitudinal direction of the helical spring,
   f. the envelope exhibits a concave profile in relation to the longitudinal direction of the helical spring over an entire length of the helical spring, wherein the concave profile is concave throughout the circumferential direction of the helical spring, and
   g. a cross-sectional area of the helical spring is at a maximum in a central portion of the helical spring in the longitudinal direction of the helical spring.

2. The pump according to claim 1, wherein the cross-sectional area of the envelope decreases or increases monotonically in the longitudinal direction of the helical spring over the entire length of the helical spring or at least in a portion.

3. The pump according to claim 1, wherein the envelope exhibits a linear profile having a constant pitch in at least one portion or over the entire length in a longitudinal section of the helical spring.

4. The pump according to claim 1, wherein magnitude of radius of curvature of the envelope is greater than 3 mm throughout.

5. The pump according to claim 1, wherein the cross-sectional area of the envelope at a first winding end of the helical spring and the cross-sectional area of the envelope at a second winding end of the helical spring are identical in size.

6. The pump according to claim 1, wherein the envelope is rotationally symmetrical, and the longitudinal axis of the helical spring forms the axis of symmetry of the envelope.

7. The pump according to claim 1, wherein the envelope exhibits a cross-sectional area having at least one of a furthest extent which is smaller than 5 cm in the longitudinal direction of the helical spring or a smallest extent which is greater than 0.5 cm in the longitudinal direction of the helical spring.

8. The pump according to claim 1, wherein winding pitch of the helical spring is constant over the length of the helical spring when not exposed to a load.

9. The pump according to claim 1, wherein a winding pitch of the helical spring is smaller than 1 cm when the helical spring is not exposed to a load.

10. The pump according to claim 1, wherein the helical spring is a helical compression spring, the characteristic curve of which comprises a linear portion and a progressive portion.

11. The pump according to claim 1, wherein the envelope forms a barrel at least when the helical spring is not exposed to a load.

* * * * *